US009452510B2

(12) United States Patent
Rattunde

(10) Patent No.: US 9,452,510 B2
(45) Date of Patent: Sep. 27, 2016

(54) ASYMMETRICAL TOOTHED WHEEL

(71) Applicant: RATTUNDE & CO. GMBH, Ludwigslust (DE)

(72) Inventor: Ulrich Rattunde, Bentwisch (DE)

(73) Assignee: RATTUNDE & CO. GmbH, Ludwigslust (DE)

(*) Notice: Subject to any disclaimer, the term of this patent is extended or adjusted under 35 U.S.C. 154(b) by 207 days.

(21) Appl. No.: 14/368,979

(22) PCT Filed: Dec. 28, 2012

(86) PCT No.: PCT/EP2012/077044
§ 371 (c)(1),
(2) Date: Jun. 26, 2014

(87) PCT Pub. No.: WO2013/098388
PCT Pub. Date: Jul. 4, 2013

(65) Prior Publication Data

US 2014/0374977 A1 Dec. 25, 2014

(30) Foreign Application Priority Data

Dec. 28, 2011 (DE) ........................ 10 2011 057 099

(51) Int. Cl.
*B23Q 3/06* (2006.01)
*B25B 1/06* (2006.01)
(Continued)

(52) U.S. Cl.
CPC . *B25B 5/06* (2013.01); *B25B 1/06* (2013.01); *B25B 1/20* (2013.01); *B25B 5/147* (2013.01)

(58) Field of Classification Search
CPC ..... B25B 1/08; B25B 1/2484; B25B 1/2468; B25B 1/06; B25B 1/20; B25B 5/06; B25B 5/147; B25J 15/0313; B25J 15/026
USPC ........... 269/24-27, 32, 228, 61, 66, 67, 225, 269/227; 74/425, 435, 135, 665 G, 437; 188/71.7-71.9, 72.7-72.9, 196 D, 196 V
See application file for complete search history.

(56) References Cited

U.S. PATENT DOCUMENTS 330,536 A * 11/1885 Wing .................... B25B 1/2452 144/253.7
2,285,572 A 6/1942 Dillenbach
(Continued)

FOREIGN PATENT DOCUMENTS

CA 2218162 A1 4/1990
DE 1244679 B * 7/1967 ............... B25B 5/06
(Continued)

*Primary Examiner* — Joseph J Hail
*Assistant Examiner* — Jon Taylor
(74) *Attorney, Agent, or Firm* — Lazaris IP

(57) ABSTRACT

A device comprises supports (3, 4) which can be moved relative to each other, and on mutually facing walls of which toothed profiles (6, 7) are provided. Each toothed profile interacts with opposing segments (31, 32) of a rotatable gear (2), by the rotation of which the supports (3, 4) can be moved in opposite directions simultaneously in a synchronized manner. The gear (2) has a varying tip circle diameter (d) along the gear circumference, wherein the tip circle diameter (d) increases along a segment (31, 32), and an effective outer diameter ($d_w$) of the gear (2) is arranged between the supports (3, 4) in a clamped rotational position, so that the effective outer diameter ($d_w$) matches a target diameter.

6 Claims, 4 Drawing Sheets

(51) Int. Cl.

| | |
|---|---|
| ***B25B 1/02*** | (2006.01) |
| ***B25B 1/20*** | (2006.01) |
| ***B25B 5/06*** | (2006.01) |
| ***B25B 5/14*** | (2006.01) |

(56) References Cited

U.S. PATENT DOCUMENTS

| | | | | | |
|---|---|---|---|---|---|
| 2,584,558 | A | * | 2/1952 | Da Costa | F16H 27/10 74/437 |
| 2,757,547 | A | * | 8/1956 | Julin | F01B 9/047 123/197.4 |
| 3,000,273 | A | * | 9/1961 | Rudolf | B23Q 3/066 269/218 |
| 3,703,833 | A | | 11/1972 | Olah | |
| 3,987,523 | A | | 10/1976 | Nelson et al. | |
| 4,765,195 | A | * | 8/1988 | Takami | F16H 29/22 475/17 |
| 5,127,140 | A | | 7/1992 | Oiwa et al. | |

FOREIGN PATENT DOCUMENTS

| | | | | | |
|---|---|---|---|---|---|
| DE | 1 463 226 | A | | 4/1970 | |
| DE | 85 26 362 | U1 | | 1/1986 | |
| DE | 199 54 369 | A1 | | 5/2001 | |
| DE | 10 2006 005 020 | A1 | | 8/2007 | |
| DE | 10 2010 021 247 | A1 | | 11/2011 | |
| EP | 0 659 520 | A1 | | 6/1996 | |
| EP | 1 193 027 | A2 | | 9/2001 | |
| FR | 2613269 | A1 | * | 10/1988 | B25B 1/06 |

* cited by examiner

ASYMMETRICAL TOOTHED WHEEL

CROSS REFERENCE TO RELATED PATENT APPLICATIONS

This patent application is filed herewith for the U.S. National Stage under 35 U.S.C. §371 and claims priority to PCT application PCT/EP2012/077044, with an international filing date of Dec. 28, 2012. The contents of this application are incorporated in their entirety herein.

BACKGROUND OF THE INVENTION

The invention relates to a device with supports capable of being moved with respect to each other according to the preamble of Claim 1.

The device is known as part of a clamping device for elongate profile sections in the prior art, for example from DE 1 463 226 A.

The known clamping devices for tube sections have separate clamping jaws by which the tube section cut to length can be positioned in a fixed manner with respect to a machining tool, for example a bevelling head. Although clamping tools of this type clamp sufficiently firmly the tube section cut to length, they are nevertheless inadequate in their precision. Tolerable deviations in the range of a few micrometers of the tube section cut to length, which can have a length of several meters altogether and can be up to 100 kg or more, are not capable of being indicated by the aforesaid clamping tools.

BRIEF SUMMARY OF THE INVENTION

The object of the invention is therefore to provide a clamping tool with a high degree of precision.

The object is attained by a device named in the introduction with the characterizing features of Claim 1. Preferred embodiments of the invention form the subject matter of the Sub-Claims.

The device has two supports which are capable of being moved with respect to each other and the mutually facing inner walls of which have toothed profiles, preferably in the form of toothed racks, which co-operate in each case with opposed segments of a toothed wheel; the two supports are preferably driven directly by cylinders or other actuating members. The supports are preferably driven simultaneously in opposed directions. The toothed wheel then permits an exact synchronization of the two supports in opposed directions. The supports can also be driven by way of the toothed wheel itself. The device claimed can be a component part of a clamping device. The clamping device can be part of an additional function of an integrated machine, for example for cutting sections of an elongate profile to length. The expression "elongate profile" is to be understood here and in the following as being hollow and solid profiles of any desired cross-section. The elongate profile sections can consist of plastics material, but in particular also of metal, or can have metal.

Despite possibilities of manufacturing the individual components, in particular the toothed wheel, but also the supports, in a highly precise manner, for example by wire erosion, deviations from the nominal dimensions of the components produced occur, which are so great that a sufficiently precise synchronized guidance of the supports is not provided despite the toothed wheel as well as a sufficiently precise clamping of an elongate profile section by means of two clamping jaws fixed in position relative to the supports. An important reason for this is the deviation, even if very small, of an effective external diameter of the toothed wheel from a nominal diameter.

In practice an entire series of toothed wheels must therefore first be manufactured in a precise manner so as then to select those toothed wheels from the production series which have a deviation still acceptable from the nominal value, in particular with respect to the tip circle diameter. It is usual for different toothed wheels and toothed racks produced in an identical manner to have different tip circle diameters along their external periphery formed by the radially outermost regions of their teeth. Although the deviations are slight and are in the 1/100 mm range, they are nevertheless too large for the precision required. According to experience, only about every fourth toothed wheel can be used for fitting in the device. A more precise manufacturing of the components in the 1 μm range would be necessary, but it is uneconomical.

Therefore, according to the invention a toothed wheel is provided in order to improve the synchronization of the two supports, which in a purposeful manner has tip circle diameters of different length along its tip circle formed by the radially outermost regions of its teeth. The tip circle diameter is to be understood in this case as being the distance between the outer points of two opposed teeth. The toothed wheel according to the invention thus has a different effective external diameter in each case depending upon the angular setting between the two supports. The effective tip circle diameter is also designated simply as the effective external diameter in this case.

In a preferred embodiment of the invention each of the supports has a clamping jaw arranged fixed in position on it, these clamping jaws co-operating in order to clamp an article in a precise position. When the two clamping jaws are moved apart from each other they release the article, and when the two clamping jaws are moved towards each other they clamp the article. The exact synchronization of the two supports and thus of the two clamping jaws is achieved by the toothed wheel according to the invention which engages in the two toothed profiles of the supports. The toothed wheel turns between the release setting and the clamping setting.

At the time of the clamping procedure, in particular of the tube section cut to length, by the two clamping jaws, which are preferably arranged on supports by way of arms, it is necessary for an effective external diameter of the toothed wheel to be provided between the two supports which corresponds to the exact nominal diameter of the toothed wheel. The nominal diameter of the toothed wheel is to be understood as being the theoretically exact tip circle diameter which an ideal toothed wheel would have in order to clamp the article exactly centrally and to position it exactly with respect to the tool in the clamped state.

On account of the different tip circle diameter of the toothed wheel along its periphery the toothed wheel can be moved by rotation into the setting in which the external diameter effective between the supports corresponds exactly to the nominal diameter. The word "exactly" is to be understood as also meaning slight deviations of ±2 μm and less in this case.

It is advantageous for each toothed wheel produced which preferably has diameters differing in a continuous manner to be used essentially in this way for the device according to the invention. It is no longer necessary for an entire series of gearwheels to be produced first so as then to select an individual ideal toothed wheel from this production series and to separate out the others.

The maximum path of travel of the supports is selected in this case in such a way that in order to clamp and release the article the toothed wheel need be turned only by a fraction of a complete revolution, preferably only by from 5° to 20°. As a result, it is possible for the external diameter of a sector of the toothed wheel to be made increasing in a continuous manner, in which case this sector can also comprise 180° of the periphery of the toothed wheel, and it is then preferable for the toothed wheel to comprise two halves arranged rotationally symmetrically by 180°. In terms of the order of magnitude the difference between the largest and the smallest tip circle diameter of the toothed wheel according to the invention is from 0.01 mm to 0.15 mm. The differences in diameter also amount to approximately from 10 to 150 times the still tolerable slight deviations of ±2 μm, depending upon the sector size and the tooth interval.

Other embodiments of the toothed wheel of variable tip circle diameter, however, are also possible. By way of example, the radius of the tip circle can remain constant over one sector, and different sectors can have different external radii. Mixed forms are also possible.

BRIEF DESCRIPTION OF THE SEVERAL VIEWS OF THE DRAWINGS

The invention is described with reference to two embodiments in three figures. In the figures

DETAILED DESCRIPTION OF THE INVENTION

Figure 1:
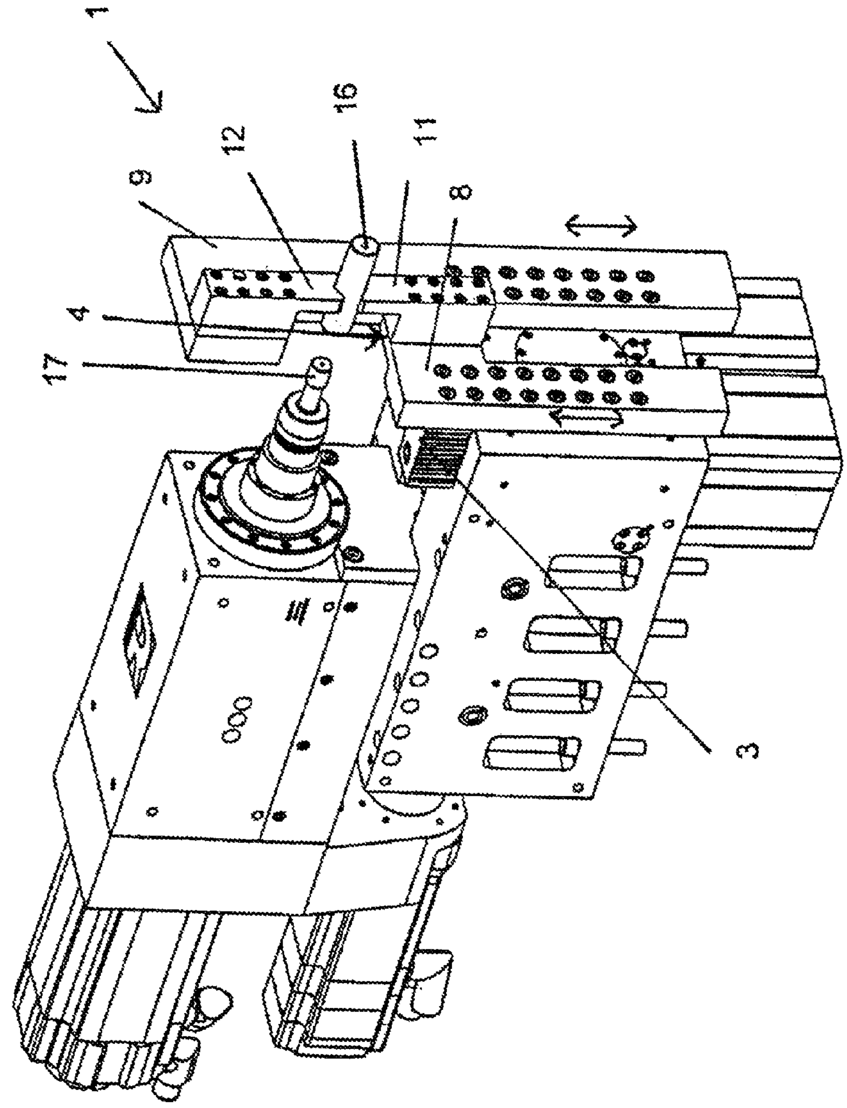
FIG. 1 is a perspective view of part of a clamping device according to the invention with a tube section clamped.

FIG. 1 shows the part of a clamping device 1 for clamping, in particular, metallic tube ends 16. The clamping device 1 is part of a profile-sawing machine (not shown). Profile-sawing machines allow sections to be sawn off from, in particular, metallic tubes or metallic solid profiles as a special form of the elongate profiles. The sawn-off profile sections can then be further machined on the ends thereof with machining apparatus in the machining procedures following the sawing. The further machining can take place for example in a bevelling process by a bevelling tool 17 or by centring boring by means of a centring bore, in particular in the case of solid profiles. The requirements for the precision of the machining are very high, so that for example during the bevelling of tube section ends the eccentricity of the bevel with respect to the external face of the material on account of clamping errors should amount at most to from 0.01 to 0.05 mm depending upon requirements.

In order to achieve such a high degree of positional accuracy it is necessary inter alia for the tools to operate in a precise manner and, to this end, to be manufactured in a precise manner. In addition, the individual components used for the clamping tool must be highly precise. That means that with respect to a toothed wheel 2 illustrated in the clamping device 1 in FIG. 2 a tip circle diameter d of the toothed wheel 2 and the accuracy of a toothed rack 6, 7 co-operating with the toothed wheel 2 should deviate at most by from 1 to 2 μm from a nominal value. Conventional manufacturing techniques, even with the wire erosion method, do not permit a sufficiently precise manufacture of the toothed wheels 2 and the toothed racks 6, 7. The toothed wheels 2 manufactured have to be tested individually, and only the toothed wheels 2 manufactured in a precise manner are selected and used for installation in a clamping tool 1.

In the case of the clamping tool 1 illustrated in FIG. 1, two mutually opposed supports 3, 4 are provided, which are movable in opposite directions and on the mutually facing inner walls of which a toothed rack 6, 7 is formed. The two toothed racks 6, 7 co-operate in each case with the toothed wheel 2 which is mounted in a rotatable manner between the two toothed racks 6, 7 of the supports 3, 4 and thus ensures the synchronization of the supports 3, 4.

The supports 3, 4 are driven in this case by way of an associated first cylinder 41 and a second cylinder 42. Alternatively, however, the drive can also be carried out directly by way of the toothed wheel 2. In the view according to FIG. 1 the left-hand support 3 is moved upwards and the right-hand support 4 is moved downwards, and in this case the toothed wheel is turned in the clockwise direction; when the toothed wheel 2 is turned in the anticlockwise direction the two supports 3, 4 are moved accordingly in the reverse direction. The toothed wheel 2 ensures the exact synchronization of the two supports 3, 4. As shown in FIG. 1, the two supports 3, 4 have arranged on them in each case arms 8, 9 with clamping jaws 11, 12 which allow the tube section 16 cut to length to be clamped and allow this clamped tube section 16 to be supplied for further machining by the bevelling tool 17.

According to the prior art a number of toothed wheels 2 are manufactured with as high a degree of precision as possible, in particular with respect to their tip circle diameter d, and out of the number use is made of only approximately every fourth or fifth toothed wheel 2 which has a sufficiently exact tip circle diameter d at least in one segment, so that the supports 3, 4 can be guided in an exact manner.

The invention solves this problem in that the toothed wheel 2 has a variable tip circle diameter d along its tip circle. An embodiment is illustrated in FIGS. 3*a* and 3*b*. The embodiment of the toothed wheel 2 according to the invention illustrated in FIG. 3*a* has two half segments 31, 32 arranged rotationally symmetrically offset by 180°. The tip circle diameter d of each of the toothed wheel half segments 31, 32 increases in a continuous manner all over each of the half segments 31, 32 in the anticlockwise direction in FIG. 2.

In this case the tip circle diameter d is to be understood here as being the distance from the centre of the toothed wheel 2, through which a toothed wheel shaft also passes, to the radially outermost point of the external periphery, i.e. the tip circle, of the toothed wheel 2, in which case the tip circle of the toothed wheel 2 is formed by a notional connecting line along the outermost points of the individual teeth. The tip circle is indicated by a broken line in FIG. 3*a* and FIG. 3*b*.

Figure 2:
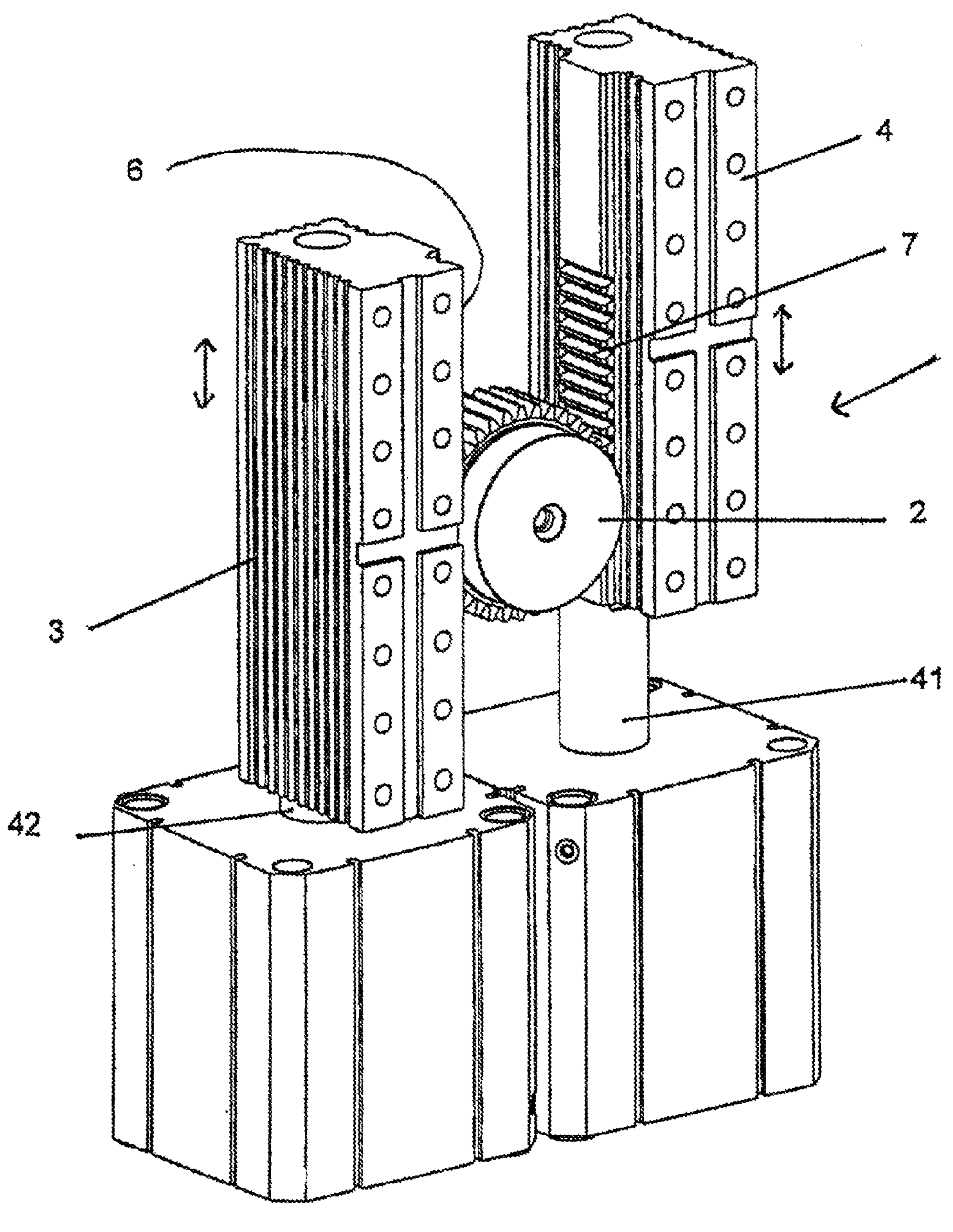
FIG. 2 shows the internal structure in FIG. 1 with two supports and an asymmetrical toothed wheel.
Figure 3A:
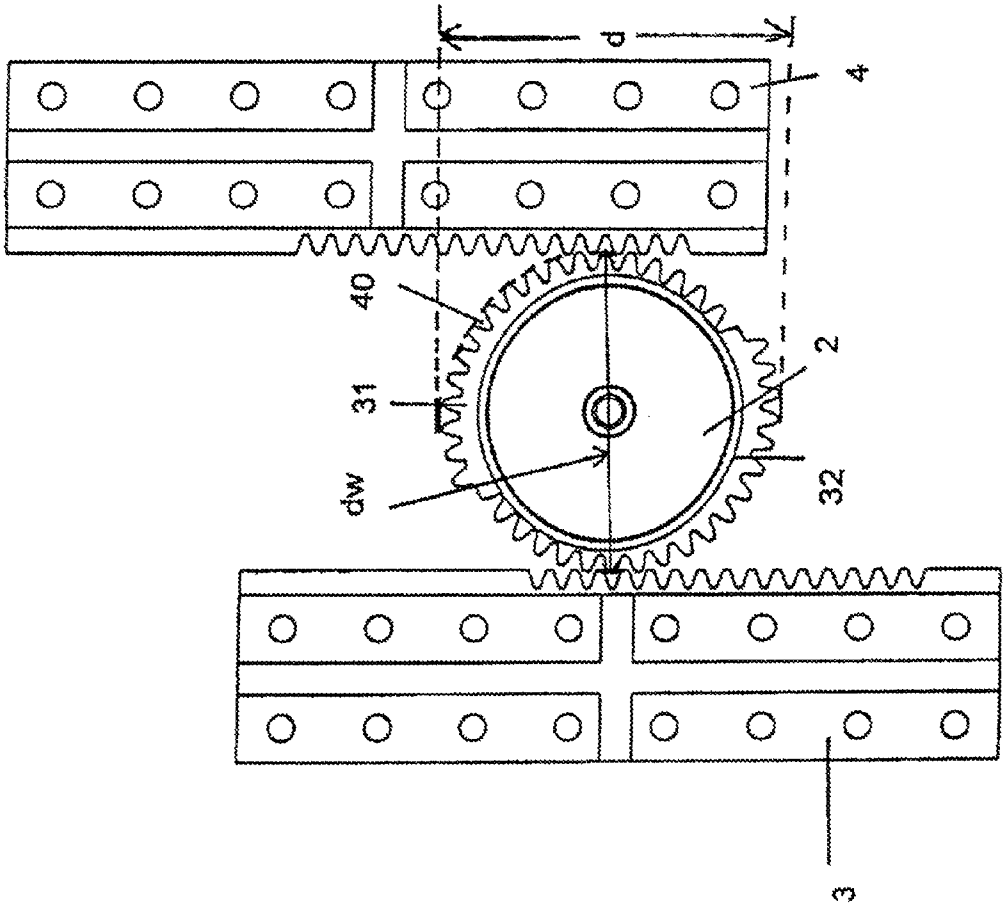
FIG. 3*a* is a front view of the clamping device in FIG. 1 in the released state.
Figure 3B:
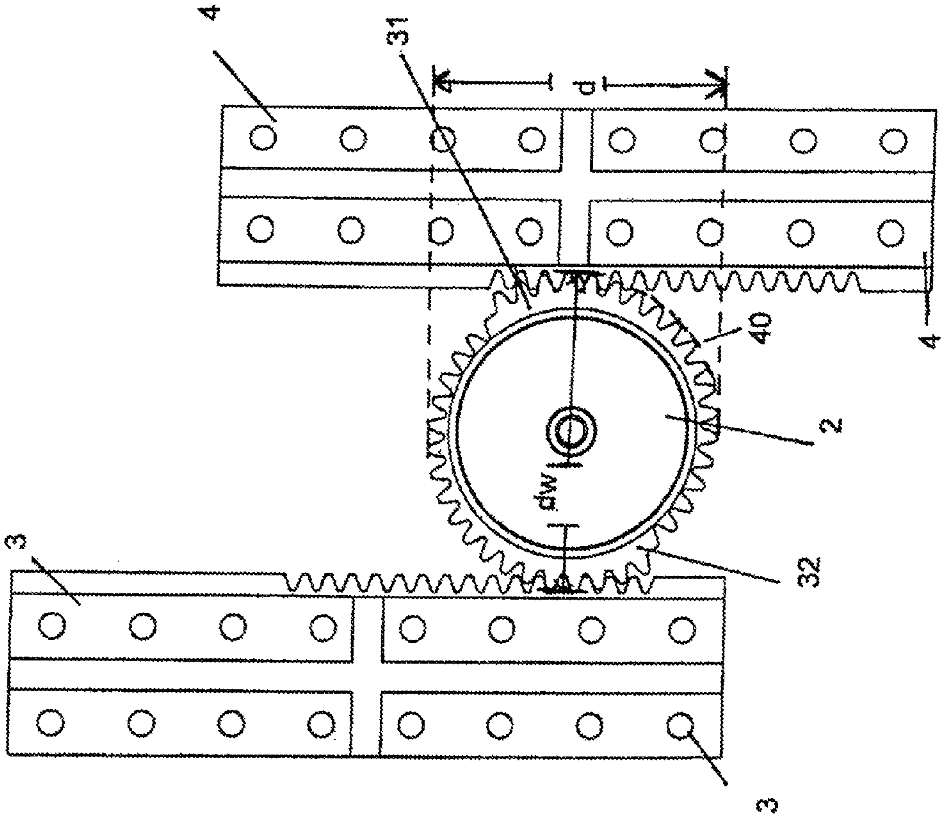
FIG. 3*b* is a front view of the clamping device in FIG. 1 in the clamped state.

FIGS. 3*a*, 3*b* are two front views of the part of the clamping device 1 illustrated in FIG. 2. The two front views of FIG. 3*a* and FIG. 3*b* differ in the setting of the toothed wheel 2 and thus in the setting of the supports 3, 4. The toothed wheel 2 in FIG. 3*a* is illustrated in a rotational setting releasing the tube section 17 and the toothed wheel 2 in FIG. 3*b* is illustrated in the rotational setting clamping the tube section 16. The device 1 illustrated in FIG. 1 is dimensioned in such a way with respect to the length of the toothed racks 6, 7, the size of the teeth and the distance of the teeth as well as the tip circle diameter d of the toothed wheel 2 that the maximum path of travel of the supports 3, 4 is so long that the toothed wheel 2 need be rotated less than 180° degrees to pass over the maximum path of travel completely. The tip circle diameter d the toothed wheel 2 varies between the lowest and the greatest value by from approximately 0.01 to 0.15 mm. The increase in the tip circle diameter d in the anticlockwise direction is thus shown greatly exaggerated in FIG. 3*a* and FIG. 3*b*. The effective external diameter $d_w$ present perpendicularly to the two supports 3, 4 movable parallel to each other in each case in FIGS. 3*a*, 3*b* changes with the rotational setting of the toothed wheel 2. The effective external diameter $d_w$ is also present perpendicularly to the toothed profiles 6, 7 of the supports 3, 4 and preferably horizontally between the two supports 3, 4.

For operation the toothed wheel 2 is positioned in its rotational setting between the two supports 3, 4 in such a way that in the clamped state as shown in FIG. 3*b*, i.e. when the two clamping jaws 11, 12 firmly embrace the tube section 16 to be clamped, the effective external diameter $d_w$ corresponds to the nominal value of the tip circle diameter d with the greatest possible degree of accuracy, preferably exactly. The clamped tube section 16 can be subjected to a machining of the end thereof in this precise position, i.e. which corresponds exactly to the nominal requirement.

In order to release the clamping jaws 11, 12 the first cylinder 41 is moved downwards and the second cylinder 42 is moved upwards, and in this way the toothed wheel 2 is turned in the anticlockwise direction in FIG. 3*b*, and other effective external diameters $d_w$, i.e. which are increasingly smaller during the unclamping, are present between the two supports 3, 4. What is decisive is the exact and high precision of the positioning at the moment of clamping the tube section 16 by the two clamping jaws 11, 12 arranged on the supports 3, 4.

LIST OF REFERENCES

1 clamping device
2 toothed wheel
3 left-hand support
4 right-hand support
6 toothed profile
7 toothed profile
8 arm
9 arm
11 clamping jaw
12 clamping jaw

16 tube end
17 bevelling tool
31 toothed wheel segments
32 toothed wheel segments
40 external periphery
41 first cylinder
42 second cylinder
d tip circle diameter
$d_w$ effective external diameter

What is claimed is:

1. A device with supports (3, 4) which are capable of being moved with respect to each other and mutually facing inner walls of which have provided on them toothed profiles (6, 7) which co-operate in each case with opposed segments (31, 32) of a rotatable toothed wheel (2), by the rotation of which the supports (3, 4) are capable of being simultaneously moved in synchronism in opposed directions, the toothed wheel (2) has a differing tip circle diameter (d) along its periphery, characterized in that the tip circle diameter (d) increases along a segment (31, 32) and an effective external diameter (dw) of the toothed wheel (2) is present between the supports (3, 4) in a clamped rotational setting and the effective external diameter (dw) corresponds to a nominal diameter.

2. A device according to claim 1, characterized in that the tip circle diameter (d) increases in a direction of rotation along the segment (31, 32) of the toothed wheel (2).

3. A device according to claim 2, characterized in that the tip circle diameter (d) increases in a continuous manner along the segment (31, 32) of the toothed wheel (2).

4. A device according to claim 3, characterized in that one of the opposed segments (32) is capable of being imaged onto the other of the opposed segments (31) by 180° rotation about an axis of rotation of the toothed wheel (2).

5. A device according to claim 4, characterized in that a maximum change in the tip circle diameter (d) is between 0.01 mm and 0.15 mm.

6. A device according to claim 5, characterized in that each of the supports (3, 4) has a clamping jaw (11, 12), which clamping jaws (11, 12) co-operate, and the toothed wheel (2) is rotatable between an opened rotational setting, in which the clamping jaws (11, 12) are moved apart from each other and release the article (16), and a clamped rotational setting, in which the two clamping jaws (11, 12) are moved so far towards each other that they clamp the article (16).

* * * * *